United States Patent [19]

Thomas

[11] 3,735,055

[45] May 22, 1973

[54] METHOD FOR IMPROVING THE SETTLING TIME OF A TRANSVERSAL FILTER ADAPTIVE ECHO CANCELLER

[75] Inventor: Edmond Joseph Thomas, New Shrewsbury, N.J.

[73] Assignee: Bell Telephone Laboratories, Incorporated, Murray Hill, Berkeley Heights, N.J.

[22] Filed: Nov. 5, 1971

[21] Appl. No.: 196,038

[52] U.S. Cl. .............................................. 179/170.2

[51] Int. Cl. .............................................. H04b 3/22

[58] Field of Search ....................... 179/170.2, 170.6, 179/170.8

[56] References Cited

UNITED STATES PATENTS 3,535,473 10/1970 Flanagan et al. .................. 179/170.2

3,632,905 1/1972 Thomas ............................ 179/170.2

*Primary Examiner*—Kathleen H. Claffy

*Assistant Examiner*—Alan Faber

*Attorney*—W. L. Keefauver

[57] ABSTRACT

The method disclosed accomplishes a reduction in the initial "distance" between the tap gain vector, of a transversal filter adaptive echo canceller, and its optimum value. The echo path bridged by the canceller is first interrogated with an impulse immediately after a connection is established. The impulse response of the echo path is sampled at the Nyquist rate, the samples are multiplied by a predetermined constant, and the weighted samples are stored. The respective gains of the tap components of the transversal filter are then set in accordance with the weighted and stored impulse response samples. Convergence thence proceeds naturally from this setting of the tap gain vector.

5 Claims, 1 Drawing Figure

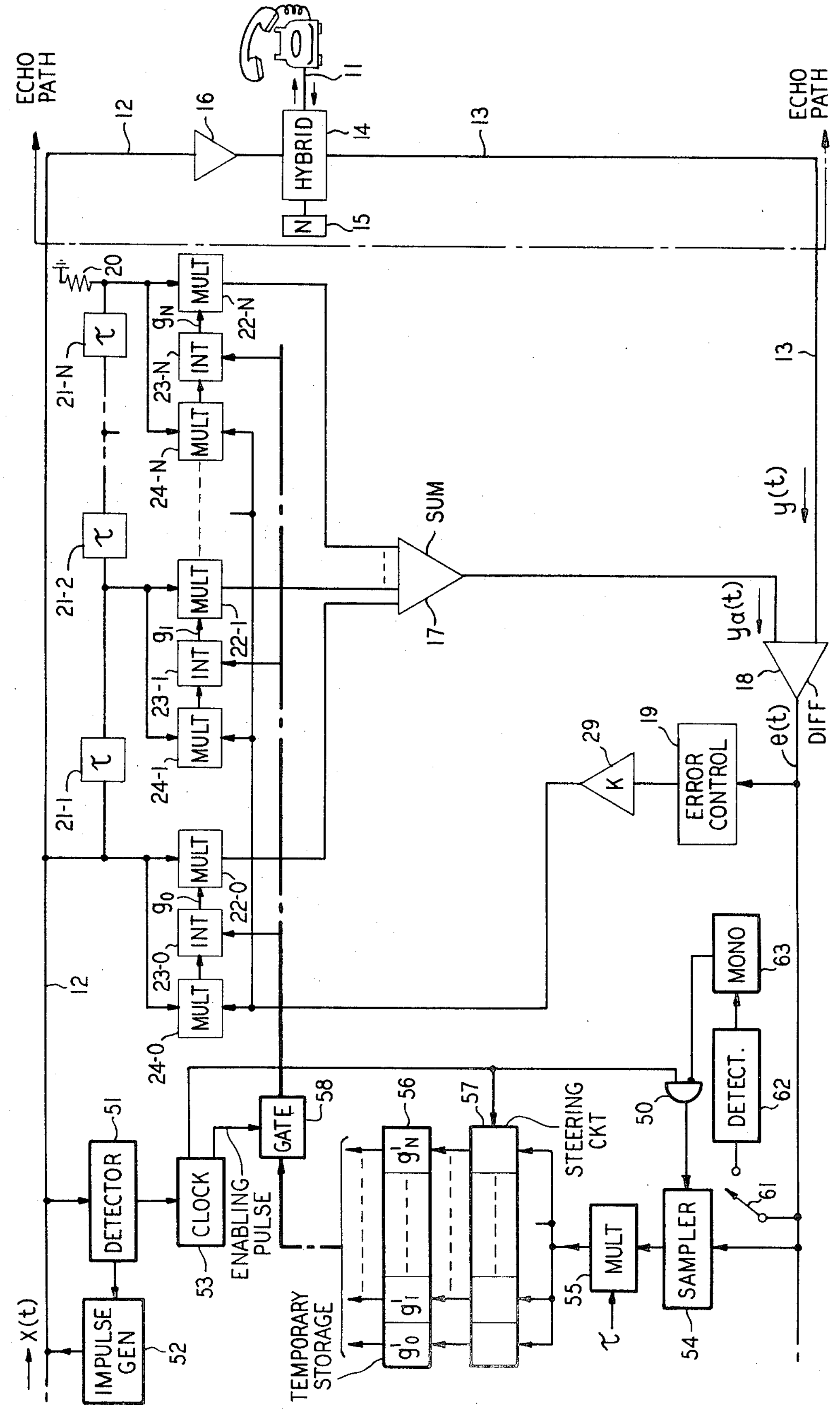
ECHO PATH
12
16
HYBRID
14
11
13
N
15
ECHO PATH
20
MULT
22-N
$g_N$
INT
23-N
21-N
$\tau$
24-N
SUM
17
21-2
$g_1$
22-1
23-1
24-1
21-1
$y(t)$
$y_a(t)$
18
DIFF
$e(t)$
29
K
19
ERROR CONTROL
$g_0$
22-0
23-0
24-0
12
MONO
63
DETECT.
62
50
61
SAMPLER
54
MULT
55
STEERING CKT
57
56
$g'_N$
$g'_1$
$g'_0$
TEMPORARY STORAGE
GATE
58
ENABLING PULSE
CLOCK
53
DETECTOR
51
IMPULSE GEN
52
$X(t)$

METHOD FOR IMPROVING THE SETTLING TIME OF A TRANSVERSAL FILTER ADAPTIVE ECHO CANCELLER

BACKGROUND OF THE INVENTION

This invention relates to the cancellation of echoes in communication circuits and more particularly to a method for improving the settling time of an adaptive echo canceller.

Echoes occur in telephone or communication circuits when electrical signals meet imperfectly matched impedance junctions and are partially reflected back to the talker. Because such signals require a finite travel time, this reflected energy, or echo, is heard some time after the speech is transmitted. As distances increase, the echo takes longer to reach the talker and becomes more and more annoying. An attempt is therefore generally made to control these reflections with voice-operated devices, known as echo suppressors. Conventional echo suppressors combat echo generated at hybrid junctions in long distance communication circuits by interrupting the outgoing, or return, path according to some decision based upon the relative levels of the incoming and outgoing signals. Since an interruption of the return signal path also interrupts the outgoing signal, the use of such suppressors, particularly in extremely long circuits, causes much talker confusion. In effect, such echo suppressors introduce chopping of the outgoing signal during periods of double-talking, i.e., during periods when the two speakers are talking simultaneously. It is apparent therefore that cancellation of echoes in the return signal path without an interruption of the path itself is desirable for satisfactory communications in circuits of extended length.

A novel solution to this problem is set forth in the article "An Adaptive Echo Canceller" by M. M. Sondhi, *The Bell System Technical Journal* of March 1967, Vol. 46, No. 3, pages 497—511. Briefly, a replica of the echo is developed by synthesizing an approximation to the echo transmission path. The replica signal is then subtracted from the return signal. Such a system, which is aptly described as an echo canceller to distinguish it from conventional echo suppressors, is characterized by a closed loop error control circuit. It is self-adapting in that it automatically tracks variations in the echo path which may arise during a conversation, for example, as additional circuits are connected or disconnected.

A problem associated with the use of a transversal filter adaptive echo canceller is the length of time required for adaptation. At the beginning of a conversation the echo canceller makes use of the first speech signals to adjust its simulation network to match that of the echo path. During this period of time, called "settling time", uncancelled echo is returned to the talker. It is desirable that the settling time be short in order to reduce adverse subjective reaction.

As will be more evident hereinafter, an adaptive echo canceller has a characteristic rate of adaptation which is determined by particular parameters in the adaptation control network. The chosen rate provides a compromise between two annoying effects. A fast rate of adaptation results in the echo canceller being adversely influenced by noise or speech from the second party of the conversation during periods of double-talking. A slow rate results in long settling time.

The settling time not only depends on the rate of adaptation, but also on the "distance" between the initial and optimum states of the echo canceller. It should be intuitively clear that if this distance can be reduced a shorter settling time will result from the same rate of adaptation, and a better compromise between the two effects mentioned above can be achieved.

Accordingly, the object of the present invention is to improve, i.e., decrease, the settling time of an adaptive echo canceller without affecting the suppression achieved.

One solution to this problem is disclosed in the copending application of E. J. Thomas and J. E. Unrue, Jr., Ser. No. 886,447, filed December 19, 1969, now U.S. Pat. No. 3,632,905. This solution is a statistical one in that tap gain magnitudes related to the statistical distribution of a plurality of echo path impulse response envelopes are stored in a permanent memory. The statistical distribution is arrived at empirically. For a given connection, the polarity of each tap component of a transversal filter adaptive echo canceller is initially determined. These determined polarities are then respectively assigned to the stored tap gain magnitudes and the tap gain components of the transversal filter are set in accordance with the same. Thereafter, the adaptive echo canceller operates normally with no further outside interference.

The foregoing solution serves to reduce settling time on the average for a large number of connections. For any particular connection, however, it may have no appreciable effect on settling time. In fact, it is entirely conceivable that on any given connection settling time may be increased. For example, if the actual echo signal of a given connection is quite small, the composite cancellation signal derived from the echo canceller, in the manner described, may overcompensate and thereby cause the echo canceller to diverge temporarily. Thus the total convergence time (i.e., settling time) will be increased in this instance.

Accordingly, it is a further object of the present invention to decrease the settling time of an adaptive echo canceller in any and all instances.

SUMMARY OF THE INVENTION

The above objects are attained in accordance with the invention by a method which accomplishes a reduction in the initial distance between the tap gain vector, of a transversal filter adaptive echo canceller, and the optimum value therefor. This, in turn, reduces the aforementioned settling time for a given characteristic rate of adaptation. To this end, the echo path bridged by the canceller is interrogated with an impulse immediately after a connection is established. The impulse response of the echo path is sampled at the Nyquist sampling rate, the samples are multiplied by a predetermined constant corresponding to the transversal filter tap delay, and the weighted samples are stored. The respective gains of the tap components of the transversal filter are then set in accordance with the weighted and stored impulse response samples. Convergence is thence permitted to proceed undisturbed (i.e., naturally) from this setting of the tap gain vector.

BRIEF DESCRIPTION OF THE DRAWING

The single FIGURE is a detailed schematic block diagram of a transversal filter adaptive echo canceller, as modified in accordance with the principles of the present invention.

DETAILED DESCRIPTION

Referring now to the drawing, a single transmission terminal is shown for interconnecting a single two-way circuit 11 with two one-way circuits 12 and 13. Local circuit 11 typically is a conventional two-wire telephone circuit connecting a subscriber to circuits 12 and 13 by way of hybrid network 14. The impedance of local circuit 11 is matched insofar as possible by balancing network 15 associated with hybrid 14. Ideally, all incoming signals received from circuit 12 are delivered by way of isolating amplifier 16 and hybrid 14 to local circuit 11. None of this energy should be transferred to outgoing circuit 13. Similarly, all of the energy reaching hybrid 14 from local circuit 11 should be delivered to the outgoing circuit 13. Unfortunately, the balancing network 15 generally provides only a partial match to the two-wire circuit so that a portion of the incoming signal (from circuit 12) reaches the outgoing circuit 13. In the absence of adequate suppression or cancellation of this signal component, or echo, the signal accompanies outgoing signals which originated in circuit 11 and are delivered over the outgoing circuit 13 to a remote station or terminal. Upon reaching the distant station this signal, which originated there in the first place, is perceived as an echo. Accordingly, echo suppression or cancellation apparatus is typically employed to eliminate this return signal.

The other apparatus shown in block diagram form in the drawing comprises a transversal filter adaptive echo canceller for cancelling the return signal, or echo, without interrupting the outgoing circuit. In a manner analogous to that described in the aforementioned M. M. Sondhi article and also in the patent to J. L. Kelly, Jr. and B. F. Logan, Jr., U.S. Pat. No. 3,500,000, issued March 10, 1970, incoming signals in circuit 12 are passed through a synthesized network to produce, at the output of summing amplifier 17, a replica of the echo signal. The replica signal is algebraically subtracted from the signals outgoing in circuit 13 through the action of the difference network 18. Signals leaving network 18, therefore, are devoid of echo components. These signals are then transmitted to the remote station.

The transversal filter adaptive echo canceller shown in the drawing is the same as that of the aforementioned Sondhi article and the Kelly-Logan patent, but modified in accordance with the invention so as to improve (i.e., decrease) the settling time thereof. The additional equipment required to implement the method of the present invention is shown in heavy outline.

A brief description of the basic echo canceller at this point is deemed appropriate. A more detailed, rigorous explanation of the same is set forth in the Sondhi article and in the Kelly-Logan patent. Accordingly, disregarding for the moment the additional apparatus required to implement the present invention, the incoming signals on circuit 12 are delivered to a transversal filter which includes a tapped delay line 21 having delay elements 21-1 through 21-N. Delay line 21 is suitably terminated by resistor 20. Each delay element of the delay line imparts a delay of $\tau$ seconds equal to the Nyquist interval of $1/2B$ where $B$ is the bandwidth of circuit 12 in Hertz. In a typical example in practice, each element of the delay line imparts an approximate one-tenth millisecond delay ($\tau$) to an applied signal. Thus, exact replicas of the signal in circuit 12 are repeatedly available at one-tenth millisecond intervals.

Individual signals produced at the taps of the delay line are adjusted in gain by means of multiplier networks 22-0 through 22-N through which they are directed, and subsequently combined in the summing network 17. Multiplier networks 22 and multiplier networks 24 (to be discussed hereinafter) are so named because circuits known in the analog computer art as four quadrant linear multipliers are used to implement these networks. Functionally, however, each of the multiplier networks 22 can be thought of as providing a changeable amount of gain (including both positive and negative gain and gain less than unity) between its respective output tap on delay line 21 and a corresponding input to summing network 17, the amount of gain presented by each of the multiplier networks 22 being directly proportional to the polarity and magnitude of a signal provided by its respective one of the integrator networks 23. Accordingly, multiplier networks 22 are also referred to hereinafter as gain control networks 22. The resultant composite signal from the output of summing network 17 is supplied to one input of difference network 18, the other input of which is supplied with signals outgoing via circuit 13. Difference network 18 effectively supplies the algebraic difference and delivers a reduced echo signal at its output.

The signals incoming on circuit 12 are speech signals characterized by erratic signal levels interspersed with silent intervals. Similarly, the signals in outgoing circuit 13 comprise a combination of locally generated signals, which vary considerably in magnitude and which are characterized by frequent silent intervals, together with delayed and attenuated replicas of the signal incoming on circuit 12, i.e., echo components. For this and other reasons, the characteristics of the transversal network must be automatically controlled to assure that the signal developed by summing network 17 closely approximates only the echo component appearing in outgoing circuit 13.

In order to cope with changing conditions, a closed error loop technique is employed. Thus, an initial replica signal produced by summing network 17 is subtracted via difference network 18 from the composite output signal in circuit 13. The resultant signal thus represents the locally generated output signal plus any residue echo - i.e., that portion of the echo signal not removed through the subtraction process. This composite signal constitutes an error component which is processed by error signal control 19 and delivered, via an amplifier 29 having a positive feedback gain constant K, in parallel to multiplier networks 24-0 through 24-N. However, the error signal is not by itself suitable for indicating the necessary adjustment of the respective gain control networks 22 to obtain full correction. Accordingly, the incoming signals which appear in variously delayed versions at the junctions of delay elements 21 are mixed by multiplication with the error components in multiplier networks 24-0 through 24-N, and the resultant signal is averaged in integrating networks 23 to produce a signal whose polarity and magnitude indicate the appropriate correction for each gain control network. Thus, if the error signal indicates a substantial remanent of the echo in the outgoing transmission line, the gain control networks 22 are individually adjusted to pass a greater portion of the incoming signal on circuit 12. Hence, the composite signal developed by network 17 and removed from the outgoing signal in network 18 tends to remove the disparity and reduce the magnitude of the error signal.

Following the adjustment outlined above, it may well be that an overshoot has occurred, i.e., the replica signal subtracted from the outgoing signal was too great. This is immediately sensed by the error signal control 19 and the gain control networks 22 are readjusted to close the gap. It has been found in practice that convergence toward essentially maximum echo removal can be achieved in a moderate time interval by thus adjusting the gain coefficients for each tap signal of the transversal filter in accordance with the integral of the product of the error signal and the signal appearing at each tap of the transversal filter delay.

An input signal, $x(t)$, gives rise to an echo signal, $y(t)$, in the outgoing transmission circuit 13. The input, $x(t)$, is also transformed by the echo canceller into a signal $y_a(t)$, which is subtracted from $y(t)$ in the difference network 18. The objective is that the resulting difference, $e(t)$, should eventually become small, i.e., that $$e(t) = y(t) - y_a(t) < \epsilon(t) \text{ for } t > T_s, \qquad (1)$$

where $\epsilon(t)$ depends on the suppression desired. The time required to accomplish this, $T_s$, is called the settling time.

Within the echo canceller $x(t)$ is delayed by multiples of a fixed time, $\tau$, thereby generating a sequence of functions $$X = \{x_i\ (t) = x(t-i\tau);\ i = 0, 1, \ldots, N\}.$$

Each of these functions, $x_i$, is multiplied by a factor, $g_i$, and summed to form $y_a(t)$, i.e., $$y_a(t) = g_0x_0 + g_1x_1 + \ldots + g_Nx_N.$$

The pertinent vector quantities can be defined as follows:

$$G \equiv [g_0\, g_1 \ldots g_N] \text{ and}$$

$$X \equiv \begin{bmatrix} x_0 \\ x_1 \\ \cdot\cdot \\ \cdot\cdot \\ x_N \end{bmatrix}.$$

From the above it will be apparent that $$y_a(t) = G \cdot X.$$

Now let the impulse response of the echo network be denoted by $h(t)$ and define the vector $$H = [h_0\, h_1 \ldots h_N].$$

For the normal case, it is known that $$y(t) = H \cdot X.$$

For equation (1) to hold for all $x(t)$ it is necessary and sufficient that the distance $\|H - G\|$ , be bounded by a number related to $\epsilon(t)$, i.e., $$\|H - G\| < E \qquad (2)$$

for $t > T_s$.

Now the control network is such that equation (2) will be met and the settling time, $T_s$, decreased as the "loop gain factor" $K$ increases. It is also intuitively clear that $T_s$ decreases as the initial distance $\|H + G\|_{t=o}$ decreases. If it is assumed that initially $G = O$ there would be an average initial distance depending on the ensemble of possible echo paths. For this so-called average or typical echo path, and for typical input functions $x(t)$, there is a characteristic settling time depending only on the adaptation control network. This characteristic settling time can be decreased by increasing the parameter $K$ in the control network. Unfortunately increasing $K$, to obtain a faster rate of adaptation, leads to the difficulties heretofore noted.

In the foregoing analysis it was assumed that $y(t)$ consisted of only the echo of $x(t)$. In practice there will, of course, also be a noise component. This noise component can be quite large. The noise will tend to make the echo canceller diverge from equation (2). The rate of divergence also increases as the parameter $K$ increases. In order to prevent excessive divergence $K$ should be small, while to prevent an excessively long characteristic settling time $K$ should be large. Clearly the value of $K$ must be a compromise. Once it is chosen other means must be sought for improving settling time.

It should be evident at this point that if the initial distance $\|H - G\|_{t=o}$ could be reduced, the settling time would also be reduced. The aforementioned copending application of Thomas Unrue disclosed a statistical solution to this problem. Unfortunately, while this latter solution serves to reduce settling time on the average, for any particular connection it may have no appreciable effect on settling time. In contrast, the solution proposed in accordance with the present invention is a deterministic one and will reduce settling time in any and all cases.

In an article authored by applicant and J. R. Rosenberger, entitled "Performance of an Adaptive Echo Canceller Operating in a Noisy, Linear, Time-Invariant Environment," *The Bell System Technical Journal* of March 1971, Vol. 50, No. 3, pages 785–813, it has been shown that the convergence or settling time of an adaptive echo canceller decreases as the quantity $$R'(o) \cdot R(o) = \sum_{i=1}^{N} (C_i - g_i(o))^2 \qquad (3)$$

decreases. $R'(o) \cdot R(o)$ is the magnitude of the vector difference between the impulse response vector and the tap gain vector at $t=o$. That is, $R'(o) \cdot R(o) = \|H - G\|_{t=o}$; $g_i(o)$ is the initial value of the $i^{th}$ tap gain; and $C_i$ is the Fourier coefficient of the echo path impulse response with respect to a distortionless tapped delay line.

The echo $y(t)$ can be shown to be $$y(t) = \sum_{i=1}^{N} \tau h(i\tau) \cdot x(t - i\tau) \qquad (4)$$

see "Adaptive Control and Optimization Techniques" by V. W. Eveleigh, McGraw-Hill Book Co. (1967) pages 172-3. For total convergence, the replica signal $y_a(t)$ can be represented as a Fourier series such that $$y_a(t) = \sum_{i=1}^{N} C_i \cdot x(t - i\tau) \qquad (5)$$

From equation (1) it will be evident that total convergence will be realized when $y(t) = y_a(t)$ and thus, comparing equations (4) and (5), at total or maximum convergence $$C_i = \tau h(i\tau) \qquad (6)$$

where $h(i\tau)$ is the $i^{th}$ sample of the echo path impulse response.

Equations (3) and (6) suggest that the settling time may be reduced if a way could be found to make $g_i(o) = \tau h(i\tau)$. This can be accomplished in accordance with the method of the present invention.

Thus, in accordance with the invention, the echo path bridged by the adaptive echo canceller is interrogated with an impulse immediately after a connection is established. The impulse response of the echo path is sampled at the Nyquist sampling rate ($1/\tau$) and the sample values ($h(i\tau)$) are multiplied by a predetermined constant corresponding to the transversal filter tap delay ($\tau$), yielding $\tau h(i\tau)$. The weighted samples are then stored temporarily. The respective gains of the tap components of the transversal filter are next set in accordance with the weighted and stored impulse response sample values, resulting in $$g_i(o) = \tau h(i\tau).$$

Thereafter, adaptation is allowed to proceed undisturbed (i.e., naturally) from this point of time.

The apparatus necessary to implement the method of the invention is shown in heavy outline in the drawing. As will be more evident hereinafter, this implementation is relatively straightforward and the various apparatus circuits thereof are well known in the art. Accordingly, the apparatus implementation will be described only briefly herein. The detector 51 monitors the input line circuit 12 and at the instant a connection is established it detects the same and delivers respective enabling signals to impulse generator 52 and clock 53. In response to this input signal the impulse generator 52 serves to generate a suitable pulse which is delivered to line circuit 12. The pulse thereupon passes through circuit 12 and hybrid 14, with a portion of the same appearing as an "echo" in the outgoing circuit 13. The enabled clock 53 generates a series of short duration pulses at the Nyquist sampling rate ($1/\tau$) and these are delivered, via gate 50 to be described, to sampler 54 which in response thereto serves to sample the outgoing signal path, i.e., the impulse response of the hybrid system to the interrogation pulse. The output of sampler 54 comprises a typical pulse amplitude modulated (PAM) signal, with sample signal values of $h(i\tau)$. The samples are then multiplied by a constant corresponding to the transversal filter tap delay ($\tau$). Such a multiplication can be readily carried out in any one of several well known manners. For example, the sample values $h(i\tau)$ can be delivered to an amplifier having a gain equivalent to $\tau$. Thus, if the selected tap delay ($\tau$) is 125 microseconds, the amplifier will have a gain of $125 \times 10^{-6}$. Alternatively, as illustrated in the drawing, the samples can be delivered to the input of a multiplier 55 having a scaling factor equivalent to $\tau$. Thus, in this instance, the samples are multiplied by a constant corresponding to $\tau$. In either case, the end result is that the sample values $h(i\tau)$ are effectively multiplied by a constant corresponding to the transversal filter tap delay ($\tau$) so as to yield the weighted sample values $\tau h(i\tau)$.

The weighted samples are then stored in the temporary store 56. This store comprises a plurality of storage cells equal in number to the number of integrators 23-0 through 23-N. The steering circuit 57 serves to steer or direct the weighted sample values $\tau h(i\tau)$ to the appropriate storage cells in store 56. To this end, the steering circuit 57 may comprise a plurality of AND gates interconnected in a conventional manner to the output of multiplier 55 and to the sampling pulse output of clock 53. Thus, the clock pulse which triggers or initiates the first PAM sample also serves to enable the appropriate AND gate so as to direct this sample to the first storage cell in store 56; in a similar manner, the second PAM sample will be steered to the second storage cell, and so on. In each case, a PAM sample is steered to one and only one storage cell. Thus, the weighted impulse response samples are temporarily stored in store 56:

$$g_i' = \tau h(i\tau) .$$

After a determined period of time (e.g., 40 milliseconds) the clock 53 delivers an enabling pulse to the gate circuit 58. The stored samples ($g_i'$) are then read out of temporary store 56 and delivered via gate circuit 58 to the respective integrators 23-0 through 23-N so as to force the respective gains of the tap components of the transversal filter to the corresponding weighted and stored impulse response samples: $g_i = g_i'$. Following this operation, the echo canceller is permitted to operate normally with no further outside interference. The aforementioned determined period of time (40 milliseconds) is not critical and gate 58 can be enabled any time between the storage of the impulse response samples ($g_i$) and the estimated first arrival of speech over input line circuit 12.

The above-recited implementation is only intended to be of an exemplary nature and it should be apparent to those in the art that other rather obvious apparatus arrangements may be devised for performing the desired functions of the present inventive method. Moreover, various digital implementations of the basic adaptive echo canceller have been proposed heretofore (see, for example, the above-noted article by Thomas Rosenberger) and the method of the invention could, of course, be readily implemented in digital form. In this vein, it should be further apparent that the essentially analogue implementation of the drawing could be modified to incorporate digital techniques. For example, a digital temporary store may be advantageously utilized by A/D converting the PAM samples to $n$-bit words and then reversing the process by D/A converting the stored digital signals back to analogue form prior to the setting of the tap components of the transversal filter. If the weighted PAM samples are, however, stored in analogue form, an improvement in signal-to-noise may be realized by first amplifying the samples by a given amount (e.g., $10^3$ to $10^6$) prior to storage and then attenuating the same by the same amount prior to the setting of the tap components of the transversal filter.

The equipment used for carrying out the method of the present invention is only required for a very short time at the beginning of each connection and therefore it can be readily time-shared between a plurality of echo cancellers.

Telephone or communication circuits that incorporate syllabic compandors, such as the N-type carrier systems (see, for example, the *Bell Laboratories Record*, March 1965, Vol. 43, No. 3), may not be effectively interrogated with short duration impulse type signals because such signals cause overloading. However, in accordance with a feature of the invention, it has been found that this overload problem can be circumvented by first conditioning the compandor with another signal before the impulse is transmitted. This is possible because the compressor of a syllabic compandor is an AGC device which supplies a decreasing amount of gain as the input signal power is increased. The gain is typically adjusted with a 10 to 15 millisecond time constant. Therefore, one can condition such a compandor with a 30 to 40 millisecond tone burst (of say 1,500 Hz), followed by a 6 to 8 millisecond pause, followed by the transmission of the interrogation impulse. However, the sampling operation must be modified so that the replica of the tone burst in the outgoing signal path 13 is not sampled.

The implementation heretofore described can be readily modified so that the method of the invention is applicable to telephone communication systems incorporating compandors. In this instance, the generator 52 responds to an input signal from detector 51 by generating a tone burst (e.g., 30 msec.) with a 6 msec. pause, for example, between the end of the tone burst and the generation of the interrogation pulse. The switch 61 is placed in its "make" condition and the detector 62 therefore monitors the line 13 so as to detect the echo of the tone burst. At the instant the same is detected an enabling signal is delivered to the monostable flip-flop 63, which in response thereto develops an output pulse of 36 msec. (for the above assumed time intervals of 30 msec. and 6 msec.). The monopulser 63 thereby inhibits the gate 50 and thus the sampler 54 for this 36 msec. interval. In all other respects, the apparatus shown in the drawing operates in exactly the same manner as previously described. The time of readout from storage via gate 58 must, of course, be adjusted to account for the 36 msec. interruption in the sampling of the impulse response but, here again, this timing is not critical.

From the foregoing description it should be apparent at this point that various modifications or alterations may be devised by those skilled in the art without departing from the spirit and scope of this invention.

What is claimed is:

1. A method for decreasing the settling time of a transversal filter adaptive echo canceller connected in shunt with an echo path and having a tap gain vector of N tap components comprising the steps of interrogating the echo path with an impulse immediately upon receipt of a connection signal, sampling the impulse response of the echo path at a Nyquist sample rate, multiplying the sample values by a predetermined constant corresponding to the transversal filter tap delay $\tau$, temporarily storing the weighted sample values, setting the respective gains of the tap components of the transversal filter to initial values corresponding to the weighted and stored impulse response sample values, and converging thence toward maximum echo cancellation, the convergence proceeding naturally after the setting of the gains of said tap components.

2. The method for decreasing settling time as defined in claim 1 wherein the transversal filter comprises a tapped delay line having a tap delay of $\tau$, said sampling being carried out at a rate of $1/\tau$, and said sample values being multiplied by a constant equivalent to $\tau$.

3. The method for decreasing settling time as defined in claim 2 including the step of delivering a tone burst to the echo path prior to the interrogation of the same with said impulse.

4. The method for decreasing settling time as defined in claim 3 including the step of inhibiting said sampling for a predetermined period so as to preclude sampling the replica of said tone burst.

5. The method set forth in claim 4 wherein the decrease in settling time is related to $R'(o) \cdot R(o)$ which is given by the equation $$R'(o)\cdot R(o)=\sum_{i=1}^{N}(C_i-g_i(o))^2$$

where $R'(o) \cdot R(o)$ is the magnitude of the vector difference between the impulse response vector and the tap gain vector at $t=o$, $g_i(o)$ is the initial value of the $i^{th}$ transversal filter tap gain and $C_i$ is the Fourier coefficient of the echo path impulse response with respect to a distortionless tapped delay line.

* * * * *